May 20, 1958   W. N. HUMPHRIES ET AL   2,835,503
GARDEN TOOL CART
Filed Feb. 24, 1956   2 Sheets-Sheet 2

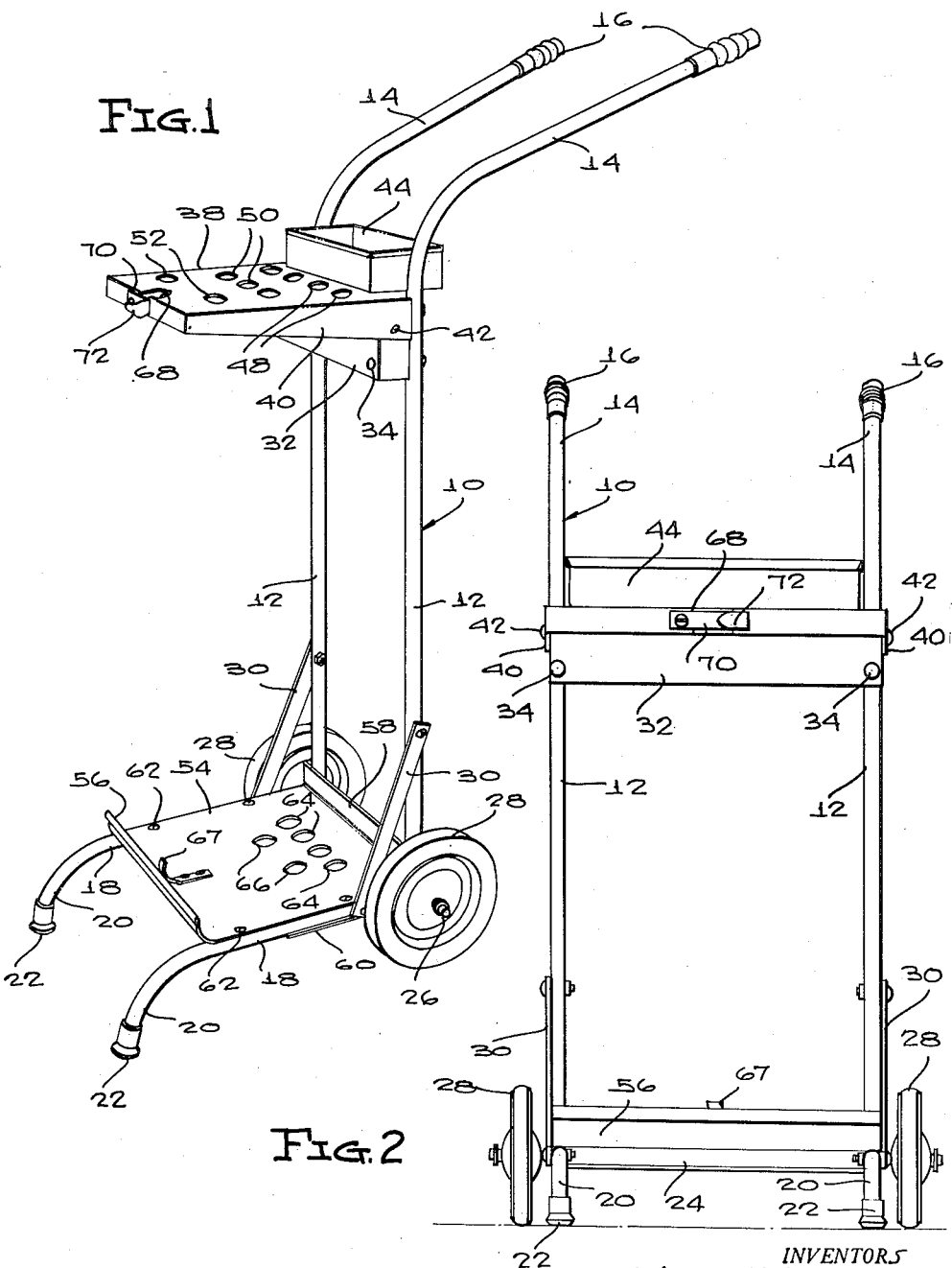

INVENTORS
WILLIAM N. HUMPHRIES
& FANNIE H. HUMPHRIES
BY
McMorrow, Berman + Davidson
ATTORNEYS United States Patent Office 2,835,503
Patented May 20, 1958

2,835,503
GARDEN TOOL CART

William N. Humphries and Fannie H. Humphries, Decatur, Ga.

Application February 24, 1956, Serial No. 567,651

1 Claim. (Cl. 280—47.19)

The present invention relates generally to tool carriers. More particularly, the invention is a light weight cart, designed for the specific purpose of storing and transporting commonly used garden tools.

Among important objects of the invention are the following:

First, to provide a garden tool cart of the type stated that will occupy a minimum of space in a basement, garage, or the like, while at the same time affording maximum storage area for commonly used garden tools;

Second, to provide a cart of the type stated wherein both large and small tools can be carried upon the cart, thus eliminating trips ordinarily required in bringing out and carrying back various tools;

Third, to provide a mobile support for tools, scissors, pruning shears, seed, etc., with all tools being supported off the ground while yet being conveniently disposed, ready for selection and use;

Fourth, to provide a cart so designed that when the tools are removed, it can be used for hauling fertilizer, soil, etc.;

Fifth, to provide a cart that will be so designed that when it is in its rest position, the several tools will be supported correspondingly in upright position, with all weight being disposed just forwardly of the axle, the construction being such that when the cart is slightly tilted, the entire weight of all the tools will be disposed directly above the axle requiring a minimum of effort to move the cart from place to place; and Sixth, to provide a cart as described which will be capable of manufacture at low cost, will be attractively designed, will be rugged, and convenient in use.

Other objects will appear from the following description, the claim appended thereto, and from the annexed drawing, in which like reference characters designate like parts throughout the several views, and wherein:

Figure 1 is a perspective view of a garden tool cart formed according to the present invention;

Figure 2 is a front elevational view thereof;

Figure 3:
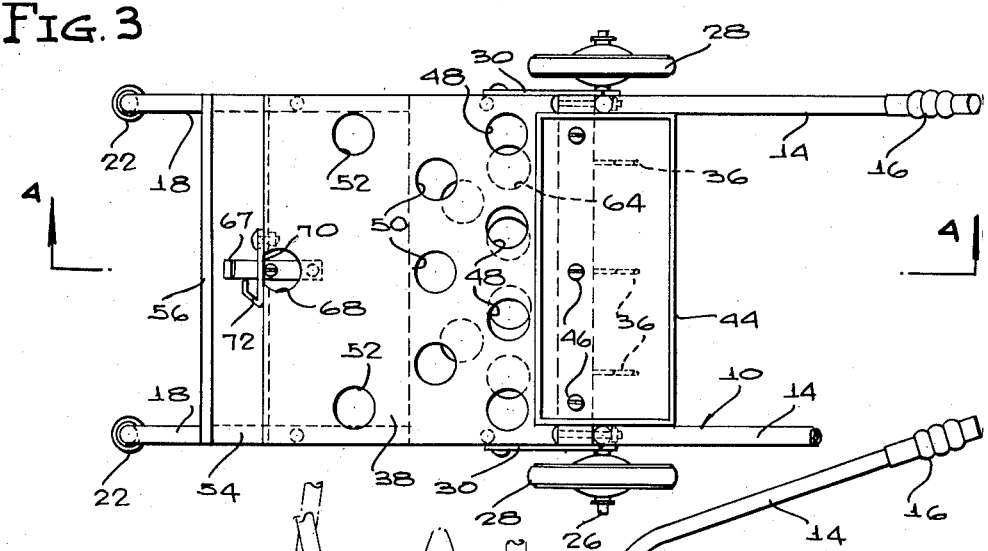
Figure 3 is a top plan view.

The cart constituting the present invention includes a support frame 10 which can be formed almost entirely of tubular stock. The frame includes laterally spaced, identically formed side members each of which is so shaped as to include an elongated, straight intermediate portion defining a standard 12, an inclined handle 14 projecting rearwardly and upwardly from the upper end of the standard 12, each handle 14 having at its free end a rubber hand grip 16, and a forwardly projecting lower end portion defining a side rail 18, said lower end portion 18 of each side member being formed at its forward, free end with a downwardly curving support leg 20 having a rubber foot or tip 22.

Welded or otherwise fixedly connected at its opposite ends to and extending between the side members of the frame, at the juncture between the standards 12 and side rails 18, is a cross member 24 of tubular stock, comprising an axle support sleeve, and rotatably bearing in said cross member is an axle 26 on the ends of which are mounted ground wheels 28. Bracing and fixedly connected between the standard and side rail of each side member of the frame is an inclined brace bar 30.

Figure 4:
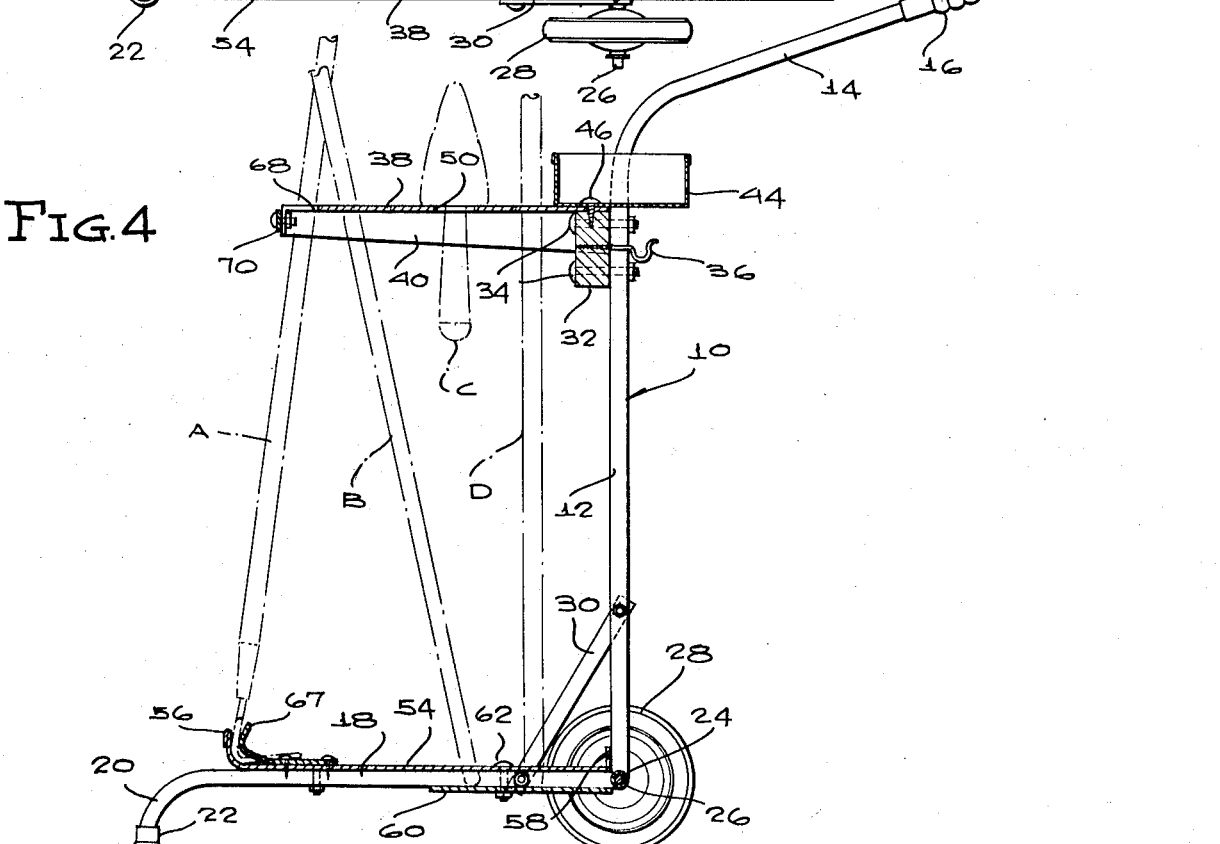
Figure 4 is a vertical sectional view on line 4—4 of Figure 3, a number of supported tools being shown in dotted outline, portions of some of the tools being broken away.

Extending horizontally between the upper ends of the standards 12 is a wooden support 32 in the form of a cross bar, connected at its ends to the respective standards by bolts 34. A plurality of upwardly facing hooks 36 can be threaded into the back surface of the cross bar 32 as shown in Figures 3 and 4, to support small tools, not shown, which can be hung upon the respective hooks.

An upper support plate 38 is of rectangular formation, and is disposed in a horizontal plane with its rear end portion in contact with the top face of the cross bar 32. Integrally formed upon the upper plate 38 are depending side flanges 40, the rear ends of which engage against opposite ends of the cross bar 32, and are secured to the cross bar by screws 42 or the like (Figures 1 and 2).

Supported upon the rear end portion of the plate 38, between standards 12, is a rectangular, upwardly opening tray 44, in which can be kept work gloves, seed, scissors, etc. Referring now to Figure 4, lag screws 46 or the like are extended through registering openings of the tray and plate into the cross bar 32 to secure the tray and plate to one another and to the cross bar.

Formed in the plate 38, forwardly of the tray, are transversely extending rows of openings 48, 50, 52. Referring to Figure 3, in the illustrated embodiment, but not necessarily, there are four openings 48, while forwardly of the openings 48 there are three openings 50 staggered relative to the openings 48. Two openings 52 are provided forwardly of the openings 50, the openings 52 being disposed adjacent the opposite side edges of plate 38.

A lower support plate 54 is also disposed in a horizontal plane, with its opposite side edge portions overlying the respective side rails 18.

At its forward end, plate 54 has an upwardly turned, curving flange or lip 36 extending the full width of plate 54, while an upwardly turned flange 58 is disposed at the back edge of the plate 54.

Underlying the rear end portions of side rails 18 (Figures 1 and 4) is a bottom plate 60, having its forward edge terminating intermediate opposite ends of the plate 54. Bolts are extended through the side rails, connecting the plates 54, 62 thereto, the bolts 62 being spaced along the opposite side edges of the plate 54 as shown in Figure 1.

Formed in the rear end portion of plate 54 are transversely extending rows of openings 64, 66, there being four openings 64 and said openings 64 being spaced smaller distances apart than are the openings 48. The row of openings 64 is in a vertical plane common to that of the row of openings 48, so that tools inserted through the openings 48 can have the lower ends of their handles engaged in the openings 64. Due to the fact that the openings 64 are not spaced as far apart as are the openings 48, the handles of the tools so disposed will diverge upwardly, so that the tool heads will be spaced a maximum distance apart, in non-interfering relation to each other.

The openings 50 are for the purpose of receiving small tools, and hence there are no openings of the lower support plate that correspond thereto. The openings 52 are associated with the respective openings 66, and it will be seen that the openings 66 are spaced rearwardly in respect to the openings 52, and also, are closer together than are the openings 52. As a result, tool handles extended through openings 52, 66 will engage against the bottom plate 60, as will the handles of the tools extended through openings 64. Further, the handles of the tools extended through openings 52, 66 will not only diverge upwardly relative to one another but also will diverge upwardly in respect to the tools extended through openings 48.

Secured to the forward end portion of the lower support plate 54, immediately in back of the upwardly turned flange 56, is a hold-down bar 67, the forward end of which curves upwardly in closely spaced relation to the flange 56. In the forward end portion of the plate 38, there is provided an opening 68, which is normally closed at its front by a latch bar 70 having a forwardly turned handle 72, said latch bar being pivotally mounted upon the front flange of the upper support plate 38.

In use of the garden cart, a rake A (Figure 4) can be disposed with its handle extending through openings 68, the handle of the rake being held in the openings by the bar 70. The head of the rake is engaged against the flange 56, with the hold-down bar 67 bearing against the rake head to hold it steady upon the lower support plate.

Any width rake head can be accommodated, as will be apparent, and can be swiftly inserted between or removed from the hold-down bar and flange 56.

Designated at B is a tool such as a mattock type hoe, and this is in an inclined position by reason of its extension through openings 52, 66. The tool handles B disposed in these openings diverge upwardly, and also are in upwardly diverging relation to the tools D which can comprise somewhat lighter, smaller-headed garden tools of various types. Tools C, such as small trowels, weeders, etc., are supported in the openings 50.

The arrangement results in the disposition of all the tools where they can be readily removed if desired, with a minimum of interference from adjacent tools. Further, a large number of tools can be supported upon the device, and the device can be readily moved from place to place. When the device is at rest, it is disposed as in Figure 4, with the weight of the tools being disposed forwardly of the axle. When, however, the device is being moved from place to place, the side rails 18 are tilted upwardly and the standards 12 tilted rearwardly, so as to dispose the weight of the tools closer to the center of the axle, thus facilitating the rolling of the cart from place to place.

With all the tools removed, bags of fertilizer, seed, etc., can be supported upon the lower support plate 54, with the straight, upwardly turned rear flange 58 and the front flange cooperating to hold objects of this type in place.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claim.

What is claimed is:

In a garden tool cart, a pair of laterally spaced, identically formed, side members each of which is rigid from end to end and includes an elongated, straight intermediate portion defining a standard, a handle projecting rearwardly from one end of the standard, and a side rail projecting forwardly from the other end of the standard, and terminating at its forward end in a downwardly extending support leg; an axle extending between and supported by said members at the juncture between the side rails and standards; ground wheels on the ends of said axle; an upper support plate projecting forwardly from and supported by the standards adjacent the handles, said plate having a plurality of openings; a lower support plate extending between and overlying the side rails, said lower plate having side edge portions supported upon the top surfaces of the side rails in direct contact therewith, the lower plate having a plurality of openings corresponding to the openings of the upper plate, for extension of tool handles through said corresponding openings of the respective plates; a bottom plate extending between and underlying the respective side rails, said bottom plate having side edge portions in direct contact with the undersides of the side rails for spacing of the bottom plate from the lower support plate by said side rails, said bottom plate having imperforate areas below the openings of the lower support plate to form abutments limiting downward movement of the tool handles through the openings of the upper and lower support plates; and fastening elements extending between the lower support plate and bottom plate for connecting the same to said side rails.

References Cited in the file of this patent

UNITED STATES PATENTS

| | | |
|---|---|---|
| 418,435 | Besse | Dec. 31, 1899 |
| 846,133 | McIntyre | Mar. 5, 1907 |
| 1,733,868 | Durell | Oct. 29, 1929 |
| 2,262,398 | Procter | Nov. 11, 1941 |
| 2,411,965 | Hartung | Dec. 3, 1946 |
| 2,435,893 | Mall | Feb. 10, 1948 |
| 2,482,372 | Rossow | Sept. 20, 1949 |
| 2,659,042 | Anderson | Nov. 10, 1953 |

FOREIGN PATENTS

| | | |
|---|---|---|
| 490,378 | Canada | Feb. 10, 1953 |
| 927,776 | France | June 11, 1946 |
| 104,432 | Great Britain | Mar. 8, 1917 |
| 314,519 | Italy | June 29, 1934 |